March 17, 1936.  T. GANNESTAD  2,034,291
VALVE MECHANISM
Filed Nov. 21, 1934  3 Sheets-Sheet 1
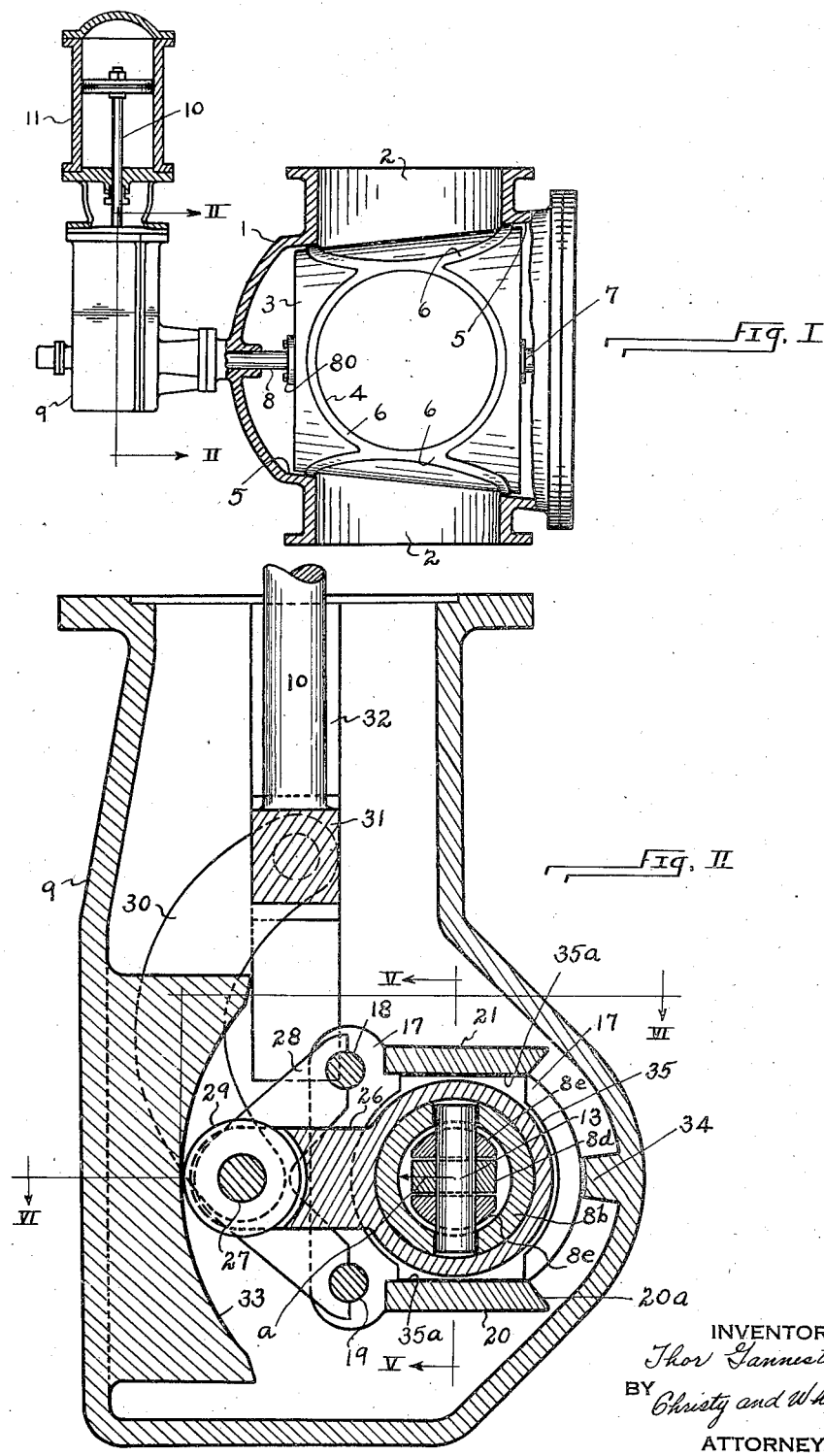
INVENTOR
Thor Gannestad
BY Christy and Wharton
ATTORNEYS.

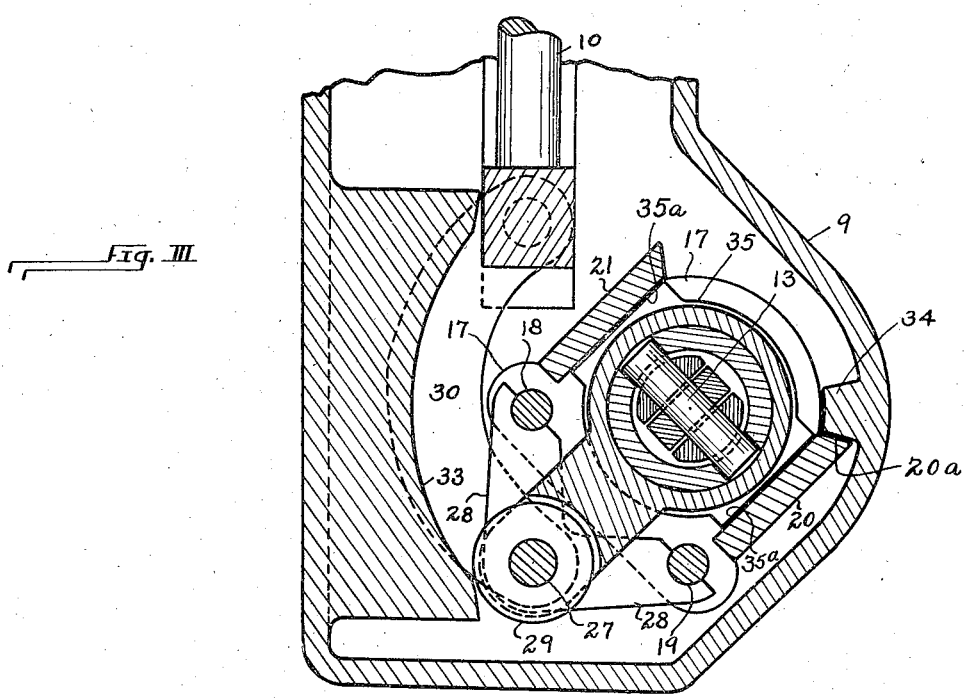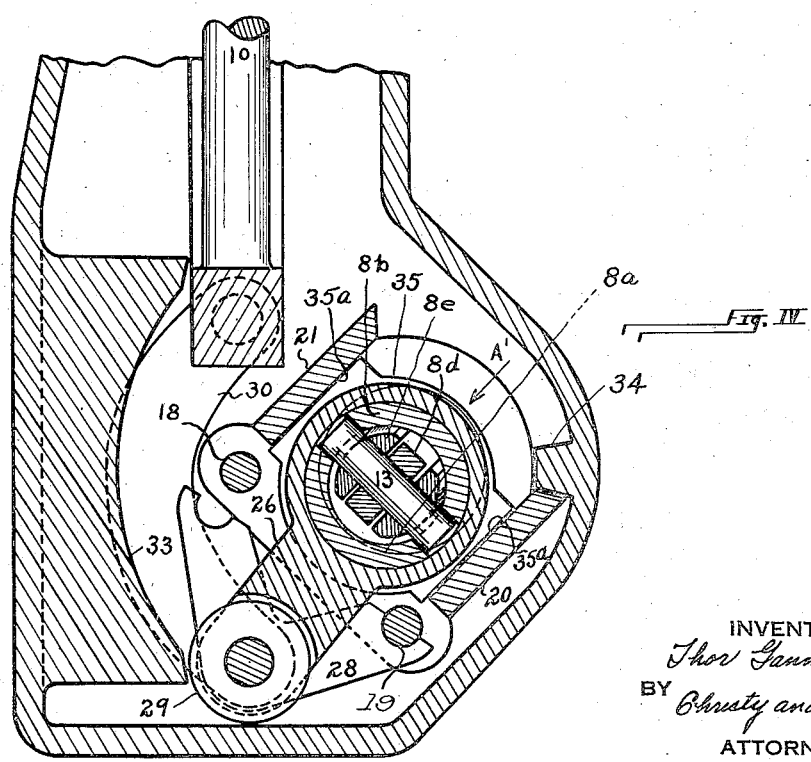

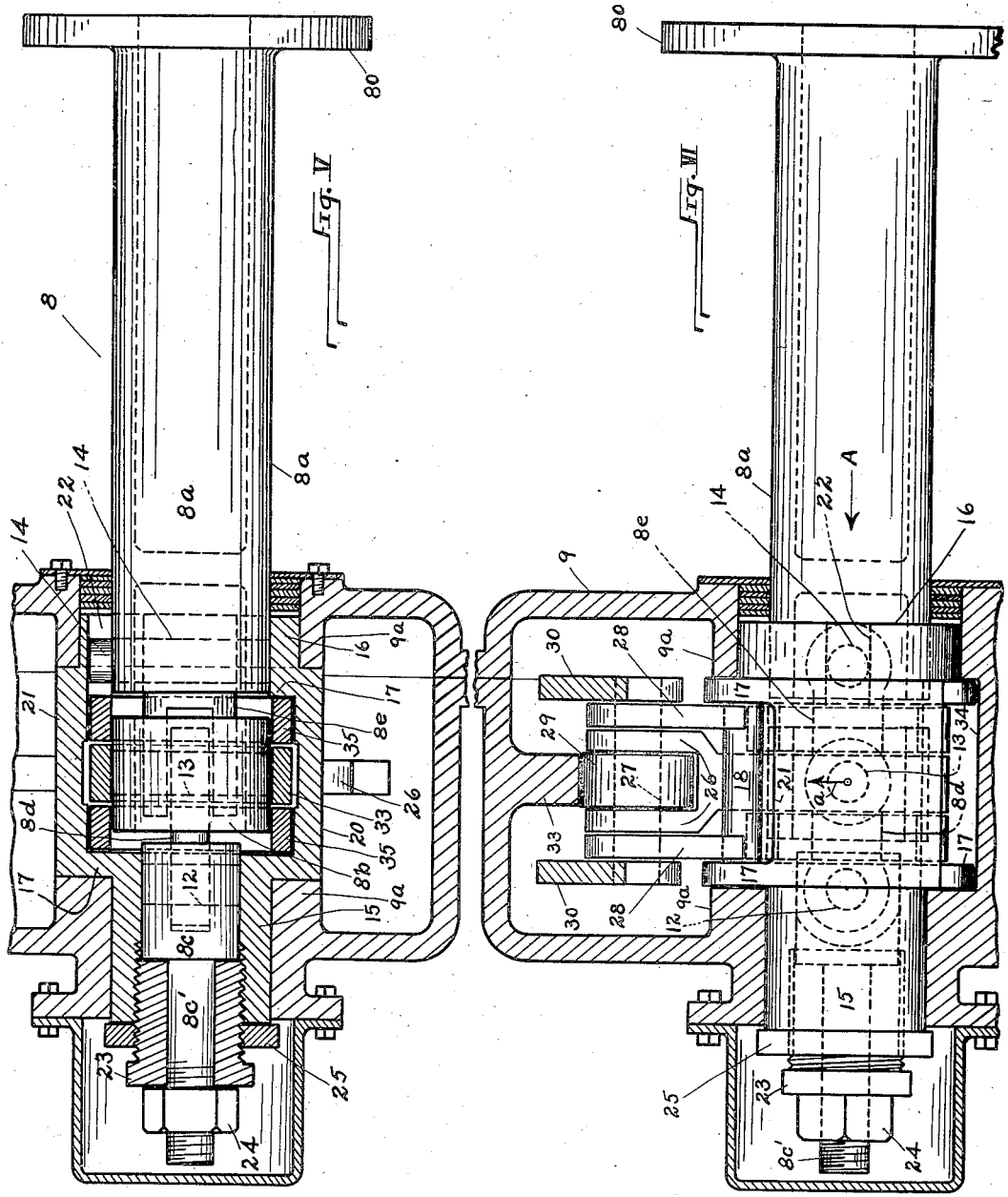

UNITED STATES PATENT OFFICE 2,034,291

VALVE MECHANISM

Thor Gannestad, Pittsburgh, Pa., assignor of one-third to John A. Voland, Pittsburgh, Pa., and one-third to Andrew Kuhl, Belle Haven, Pa.

Application November 21, 1934, Serial No. 754,042

13 Claims. (Cl. 251—97)

My invention relates to plug valves. A valve of this sort includes a conical, transversely ported plug which is rotatable between open and closed positions for controlling flow through the valve. The flow controlling plug normally rests upon a tapered seat, and, preparatory to rotary adjustment, the plug is axially shifted into unseated position, and is restored to seated position when such adjustment has been effected. Thus, the operation of the valve involves rotation and axial movement of the conical plug. More particularly my invention consists in improvements in mechanism for operating a plug valve of this type.

In the accompanying drawings Fig. I is a view, partly in side elevation and partly in vertical section, of a plug valve embodying the operating mechanism of this invention. Fig. II is a sectional view, taken on the plane II—II of Fig. I, and showing the operating mechanism to larger scale. Figs. III and IV are fragmentary sectional views, comparable with Fig. II, and illustrating the mechanism in successive stages of operation. Fig. V is a sectional view, taken on the plane V—V of Fig. II. And Fig. VI is a view of the mechanism partly in section and partly in elevation, as viewed on the broken plane VI—VI of Fig. II.

Referring to Fig. I of the drawings, the reference numeral 1 is applied to the body of the plug valve which in this case has been chosen for illustration. The passage 2 through the valve is controlled by a conical plug 3, including a transverse port 4 which, extending in the line of sight in Fig. I, is shown in one of its alternate positions of service—in valve-closing position. The plug 3 is rotatably borne by a bearing 7 and an operating stem 8, and the rotation of the stem through ninety degrees is effective to move the plug 3 upon its axis, and thereby to move the port 4 from its illustrated position into its alternate position—a position of registry with the valve passage 2. It will be understood that the conical plug 3 is normally seated against the tapered wall 5 of the valve body, and, conveniently, the side surface of the plug carries gasket elements 6, which provide a sealed seating of the plug in its alternate positions of service.

The stem 8 extends into a casing 9, which casing houses (in a bath of oil) the mechanism for operating the valve plug 3. Such mechanism is adapted to function in response to the axial movement of a shaft 10, and, as shown in this case, the shaft 10 may comprise the piston rod of reciprocating engine 11. The travel of the rod in either direction of reciprocation may be controlled by known means, whereby, at the will of the attendant, the mechanism in housing 9 may be operated for powerfully opening and closing the valve.

Turning to Figs. V and VI of the drawings, the valve-operating mechanism will be considered in detail. The valve stem 8 is a flexible thing, and in this case comprises an elongate tubular element 8a, a relatively short sleeve element 8b, and a terminal element 8c. The terminal element 8c is connected to the sleeve element 8b by a link 8d, whose opposite ends are pivotally secured to such elements by pins 12 and 13, respectively; and the sleeve 8b is in like manner secured to the element 8a, by means of a link 8e extending from the pin 13 to a pin 14 which is secured in the element 8a.

The assembled valve stem is organized with a special journal or actuating member including two cylindrical, tubular portions 15 and 16 that are rotatably trunnioned in the opposite side walls of the casing 9, as shown in Fig. VI. Each tubular portion carries a flange 17 extending perpendicularly to the axis thereof (see Figs. VI and II); the two flange portions 17 are spaced apart, and are rigidly united in such relation by two cross-pins 18 and 19 and two cross-plates 20 and 21, arranged in the relative positions shown in Fig. II. Advantageously, the several elements of this special journal are integrally fashioned from a single metal casting. In Fig. VI it will be observed that the flange portions 17 severally bear laterally against bearing portions 9a formed on the walls of the casing 9; thus the movement of the special journal (15, 16, 17, 18, 19, 20, 21) is limited to rotation about the common axis of the tubular portions 15 and 16.

The outer end of the element 8a carries a flange 8θ, by means of which the stem structure is united with the plug 3 (see Fig. I), and the inner end of element 8a extends into the tubular portion 16 of the special journal (see Fig. V). The tubular portion 16 includes an internal slot 22 extending lengthwise thereof; one terminal of the pin 14 (which pin secures the link 8e to the element 8a) projects as a key into this slot, and unites the stem element 8a with the special journal for common rotary movement, while admitting (within the length of the slot) of axial movement of the stem relatively to the special journal. The stem element 8c is rotatably organized within the tubular portion 15, and the sleeve element 8b of the stem lies between the two flange portions 17 and the two cross-plates 20, 21 of the special journal. The stem element 8c includes a threaded shank 8c' which extends through a bushing 23. A nut 24 upon the shank serves to secure the element 8c in fixed axial relation with respect to the bushing, as may be observed in Fig. V. While the element 8c and shank 8c' are rotatable within tubular portion 15 and bushing 23, it will be noted that relative axial movement of such parts is positively restrained; that is, the bushing 23 is fixed in the tubular portion 15, and the nut 24 prevents axial movement of the parts 8c, 8c' relatively thereto. Advantageously, the union of the bushing 23 with the tubular portion 15 is a threaded union, permitting adjustment of the bushing in its otherwise fixed relation to the tubular element 15, and this feature of adjustment will be further described in the following pages. A nut 25 is employed in well-known way to lock the bushing in position of adjustment.

It will be perceived that the tubular portions 15 and 16 of the special journal hold the stem elements 8a and 8c in axial alignment. It will further be observed (see Fig. II) that, save as restrained by means yet to be described, the sleeve element 8b is movable laterally of the axis of the aligned elements 8a and 8c, and in this case such lateral movement of the element 8b must be in a direction perpendicular to the axes of pins 12, 13, 14, as indicated by the arrow a, Figs. II and VI. Since the elements 8a and 8c are held in alignment, and since the element 8c is secured against axial movement, the lateral movement of the intermediate element 8b, manifestly, effects the axial shifting of the element 8a, together with a corresponding movement of the valve plug 3 secured to the flange 8α. When sleeve element 8b is aligned with the elements 8a and 8c, the connecting links 8d and 8e extend in alignment, as shown in Fig. VI, and the overall, effective length of the stem 8a, 8b, 8c is maximum. When, however, the sleeve element 8b is laterally shifted in the direction of the arrow a, the links 8d and 8e incline to one another, and shift the axially movable element 8a in the direction of the arrow A, thus reducing the effective length of the valve stem. It will be understood, therefore, that the lateral shifting of the sleeve element 8b either into or out of alignment with the elements 8a and 8c is effective either to increase or decrease the effective length of the valve stem, which in turn axially shifts the valve plug 3 either away from or toward its seat 5 (see Fig. I). By adjusting the fixed position of the bushing 23 in the tubular portion 15, the position of the stem element 8c is so determined that, when the stem 8a, 8b, 8c is axially expanded, the valve plug is unseated and ready for rotary adjustment between its alternate positions of service, and, alternately, when the stem is axially contracted, the valve plug is drawn tightly into seated position upon the wall 5.

Due to the engagement of the pin 14 with the key-way 22, the rotation of the special journal (15, 16, 17, 18, 19, 20, 21) in bearings 9a produces the rotation of the valve stem (8), together with the valve plug (3), and attention will now be directed to the mechanism which is responsive to the reciprocable rod 10 for laterally shifting the sleeve element 8b (to unseat and seat the valve plug), and for rotating the special journal (and with it the valve stem 8) while said plug is unseated.

As may be seen in Fig. II, a lever 26 at its one end encompasses the sleeve element 8b of the valve stem; at its opposite end the lever carries a pin 27 upon which two dogs 28 are pivotally mounted in spaced-apart relation; between the dogs 28 a wheel 29 is carried by the pin (see Fig. VI). Outwardly of the dogs 28, a pair of connecting rods 30 are secured at their lower ends to the pin 27, and the upper ends of such rods are pivotally connected to a cross-head 31, which cross-head is secured to the piston rod 10 and is slidable in ways 32 formed in the walls of casing 9. The engagement of the lever 26 with the sleeve element 8b is a slip engagement, so that, save as hereinafter explained, the lever may swing (in response to the thrust of the piston rod 10) without rotating the sleeve element. An arcuate guide rail 33 is provided, and the wheel 29 normally rides the face of this rail. The curvature of the guide rail is so determined that the lever 26, swinging about the sleeve element 8b as an axis, serves to hold such sleeve element in axial alignment with the other valve stem elements, 8a and 8c.

Each of the dogs 28 includes two diverging arms, which are recessed or notched at their ends, and severally engage the two cross-pins 18 and 19 of the special journal (see Fig. II). As the lever 26 is swung counterclockwise, the lower arms of the dogs 28 serve as compression links between the pin 27 and the pin 19, with the consequence and effect that the special journal (15—21) and lever 26 rotate in unison. And as already mentioned, the keyed connection 14, 22 (Fig. V) insures rotation of the valve stem with the special journal.

In Figs. II, V, and VI the mechanism is shown in medial position in the course of its operation for moving the valve plug 3 from its closed to its open position. In this operation the piston rod 10 moves powerfully downward, rotating in unison the lever 26, the special journal (15—21), and the valve stem 8a, 8b, 8c. During this common rotation of the parts, the links 8d and 8e are aligned (Fig. VI), and, accordingly, the rotating valve stem is elongated and the valve plug is unseated. A stop 34 is provided within the casing 9; when, during this rotation of the parts, the port 4 reaches a position of registry with the valve passage 2 (Fig. I), the forward edge 20a of the journal cross-plate 20 comes to abutment with such stop 34, and the wheel 29 reaches the lower end of the rail 33, as shown in Fig. III.

The abutment of the cross-plate 20 with the stop 34 positively prevents further counterclockwise rotation of the special journal (15—21), and thus the valve plug, while it is still unseated, is not rotated past its position of registry with the valve passage 2. The downward thrust of the piston rod 10 is, however, still effective upon the distal end of the lever 26, and such thrust reacts through the lower arms of the dogs 28 and against the pin 19 of the special journal. That is to say, the lower arms of the dogs 28 cause the distal end of lever 26 to swing about the pin 19 as a center, it being understood that at this stage of the operation the wheel 29 no longer engages the rail 33. As Fig. IV indicates, the downward swinging of the distal end of lever 26, about the pin 19 as a center, forces the upper arms of the dogs 28 from engagement with the cross-pin 18 of the special journal, and such swinging of the outer end of the lever 26 is manifestly accompanied by a linear shifting of its inner end—the end which embraces the sleeve element 8b of the valve stem. Thus, the sleeve element 8b is laterally shifted from alignment with stem elements 8a, 8c, and, in the manner already described, the valve stem element 8a is moved axially (see arrow A in Fig. VI), drawing the valve plug 3 into tightly seated position.

Since the pivotal interconnection of the links 8d and 8e in this case comprises a pin 13, it is desirable that the lateral movement of the sleeve element 8b shall be rectilinear, and perpendicular to the axis of the pin, such as indicated by the arrow A' in Fig. IV. To this end I provide guide rings 35 upon the sleeve element 8b, one on each side of the lever 26 (see Figs. IV and V); internally the guide rings slideably engage the cylindrical surface of the sleeve element, and externally they include opposite flat faces 35a which slideably engage the spaced-apart cross-plates 20, 21 of the special journal. Thus, while rotation of the sleeve element 8b is unrestrained by the guide rings, the lateral movement of the sleeve element is positively limited to a rectilinear course, extending between and parallel to the cross-plates 20, 21.

When the valve 1 is to be closed, the piston rod 10 is caused powerfully to rise, and the distal end of lever 26 is swung clockwise about the pin 19, carrying the upper arms of the dogs 28 into engagement with the cross-pin 18, and shifting the sleeve element 8b in a direction opposite to the arrow A' in Fig. IV. The wheel 29 is thus brought into engagement with the rail 33, and the sleeve element 8b is brought into axial alignment with the stem elements 8a, 8c, whereby the valve stem is elongated and the valve plug 3 is unseated. The special journal (15—21) and the valve stem 8 do not rotate until the upper arms of the dogs 28 engage the cross-pin 18, so it will be understood that the initial upswing of the lever 26 serves only to unseat the valve plug 3. As the upward travel of the piston rod 10 continues, ordinarily without intermission, the valve plug is unseated, and (when the upper arms of the dogs 28 engage the cross-pin 18) the special journal and the valve stem begin clockwise rotation, turning the valve plug 3 toward closed position. The cross-plate 20 is thus swung from engagement with the stop 34. The upward swing of the mechanism continues until the forward edge of the cross-plate 21 comes to abutment with the stop 34 from above. As these positions of the parts are reached, the valve plug 3 will be found in closed position, indicated in Fig. I. While the stop 34 stays the valve stem and plug 3 from further clockwise rotation, the piston rod continues upward, and the distal end of the lever 26 swings about the cross-pin 18 as a center, effecting the lateral shifting of the sleeve element 8b, and the consequent seating of the valve plug 3. When the valve plug is tightly seated, the parts, manifestly, are restrained from further movement, and, subject to the upward pull of the piston 10, such parts remain at rest.

It will be perceived, therefore, that I have provided a relatively simple mechanism which is responsive to a reciprocating rod for opening and closing a plug valve. The mechanism is certain in operation, and is economical to construct, and to maintain in operable condition. It is further noteworthy that my mechanism comprises in the main a pivotally interconnected mechanical linkage, whereby relatively great strength is obtained in an installation of given size, and wear is reduced to a minimum. And, as above indicated, substantially the whole mechanism is adapted to function under a pool of oil within the casing 9. The above specification has not dwelt upon the provision of anti-friction bearings between the relatively movable parts, nor the provision of liquid-tight packings for the valve stem; these and other such details are matters for the engineer.

I claim as my invention:

1. In a valve embodying a valve plug and a seat for said plug, the combination of a rotary valve stem connected to said plug, said stem being laterally flexible between its opposite ends for varying the effective length of the stem, and means for rotating and laterally flexing said stem, said means including an oscillatory lever rotatable about the axis of said stem as it moves through a portion of its range of oscillation and being adapted to move laterally of such axis as it moves through another portion of its range of oscillation.

2. The structure of claim 1, in which a rotary actuating member cooperates with said lever to effect rotation of the valve stem during the movement of said lever through a portion of its range of oscillation.

3. The structure of claim 1, in which a rotary actuating member cooperates with said lever to effect rotation of the valve stem during the movement of said lever through a portion of its range of oscillation, and a stop for limiting the rotary movement of said actuating member.

4. In a valve embodying a valve plug and a seat for said plug, the combination of a valve stem including a plurality of rigid stem elements flexibly connected end to end, one of said rigid stem elements being connected to said plug, means for rotating said last-named element to effect the rotary adjustment of said plug, and another of said rigid stem elements being movable laterally of the series to effect the axial shifting of said plug.

5. In a valve embodying a valve plug and a seat for said plug, the combination of a valve stem including a plurality of rigid stem elements connected end to end, one of said rigid stem elements being connected to said plug, another of said rigid stem elements being movable laterally to effect the axial adjustment of said plug, and means for effecting a coordinated application of torque to the first stem element and lateral stress to the second stem element, to effect in sequence the axial adjustment and rotation of said plug.

6. In a valve embodying a valve plug and a seat for said plug, the combination of a valve stem, a rotary actuating member, means for connecting said actuating member with said stem for common rotary movement, a movable member for exerting lateral stress on said stem, arcuate guiding means for controlling the movement of said last-mentioned member through a portion of its range of movement, and linear guiding means cooperating with said last-mentioned member through another portion of its range of movement.

7. In a valve embodying a valve plug and a seat for said plug, the combination of a rotary valve stem connected to said plug, and means for rotating said stem in opposite directions within predetermined range; said means comprising an operating rod movable in opposite directions, a rotary member, a sliding connection for securing said valve stem to said member for common rotation while admitting of axial movement of the stem relatively to such member, and means connecting said operating rod with said rotary member, whereby movement of said rod in either direction effects a corresponding rotation of said rotary member and valve stem in common.

8. In valve-operating mechanism, the combination of a valve stem comprising a series of interconnected elements, one of said elements being movable laterally of the others for varying the effective length of said stem, a lever extending from said laterally movable element, said lever being swingable in opposite directions of rotation about said laterally movable member as an axis, and means for effecting lateral movement of said element during the swinging of said lever.

9. The structure of claim 8, in which said means include a dog carried by the distal end of said lever.

10. The structure of claim 8, in which said means include a dog operative alternately on opposite sides of said lever, to effect the lateral movement of said stem element during the swing of the lever in opposite directions.

11. The structure of claim 8, in which guiding means cooperate with said lever for holding the lever in circular course through a portion of its swing.

12. The structure of claim 8, in which guiding means cooperate with said lever for holding the outer end of the lever to circular course through a portion of its swing, and for limiting the inner end of said lever to linear movement during a portion of such swing.

13. In valve-operating mechanism, the combination of an actuating member rotatable in opposite directions, a stop for limiting the range of rotation of said member, a valve stem extending axially of said member, said valve stem including a plurality of relatively movable elements, means for securing at least one of said elements to said member for common rotation therewith, while permitting axial movement of said element relatively to said member, means for rotating said member, and means for moving an element of said stem laterally of the axis of said member.

THOR GANNESTAD.